United States Patent [19]

Sakaguchi et al.

[11] Patent Number: 4,909,455
[45] Date of Patent: Mar. 20, 1990

[54] METHOD AND DEVICE FOR WINDING MAGNETIC TAPE USING MAGNETIC ALIGNMENT

[75] Inventors: Masaaki Sakaguchi; Kazuo Kubota; Keisuke Wakatsuki; Mitsunobu Usui, all of Kanagawa, Japan

[73] Assignee: Fuji Photo Film Co., Ltd., Kanagawa, Japan

[21] Appl. No.: 385,960

[22] Filed: Jul. 28, 1989

Related U.S. Application Data

[63] Continuation of Ser. No. 8,040, Jan. 29, 1987, abandoned.

[30] Foreign Application Priority Data

Jan. 30, 1986 [JP] Japan .................................. 61-16886
Apr. 3, 1986 [JP] Japan .................................. 61-48899
Apr. 3, 1986 [JP] Japan .................................. 61-48900

[51] Int. Cl.⁴ ...................... B65H 18/26; G11B 05/84
[52] U.S. Cl. ................................... 242/67.1 R; 242/76
[58] Field of Search ................... 242/67.1 R, 76, 78, 242/78.1, 179, 186; 226/93–97; 360/66

[56] References Cited

U.S. PATENT DOCUMENTS

| 2,481,392 | 9/1949 | Camras | 360/66 X |
| 3,849,794 | 11/1974 | Arimura et al. | 242/76 X |
| 4,013,241 | 3/1977 | Gray | 242/84.52 B |
| 4,343,441 | 8/1982 | Graham | 242/68.1 |
| 4,462,055 | 7/1984 | Jackson et al. | 360/118 |
| 4,763,218 | 8/1988 | Westfall et al. | 360/66 X |

FOREIGN PATENT DOCUMENTS 6151642  3/1986  Japan .

OTHER PUBLICATIONS

IBM Technical Disclosure Bulletin vol. 5, No. 10, Mar., 1963, p. 77.

Primary Examiner—Stuart S. Levy
Assistant Examiner—Steven M. DuBois
Attorney, Agent, or Firm—Sughrue, Mion, Zinn, Macpeak & Seas

[57] ABSTRACT

A tape winding device in which magnetic tape is wound onto a reel. One or more magnets exert a magnetic force on the wound tape in a direction along the thickness of the tape, that is, along a diameter of the reel, in order to neatly wind the tape. The magnets may be movable radially to maximize the magnetic force or be moved axially to control the axial position of the tape independently of the reel flanges.

15 Claims, 7 Drawing Sheets

METHOD AND DEVICE FOR WINDING MAGNETIC TAPE USING MAGNETIC ALIGNMENT

This is a continuation of application Ser. No. 008,040, filed Jan. 29, 1987, now abandoned.

BACKGROUND OF THE INVENTION

Field of the Invention

The present invention relates to a method and a device for winding a magnetic tape, such as winding a magnetic tape of prescribed length from a source roll of a magnetic tape to a small tape winding body, rewinding a magnetic tape from a tape winding body to another tape winding body, winding a magnetic tape of large width for a source "roll", and winding a magnetic tape of large width to a plurality of tape winding bodies while slitting the tape.

A process of manufacturing a magnetic tape such as an audio cassette tape, a video cassette tape, a memory tape and a broadcasting video tape includes a step of winding a magnetic tape of prescribed length from a source roll of a large-length tape to a small tape winding body such as a reel and a hub, a step of rewinding a magnetic tape from a tape winding body to another tape winding body, a step of winding a magnetic tape of large width as a source tape, a step of winding a magnetic tape slit from another magnetic tape, and so forth. When the magnetic tape is wound on the tape winding body in the process of the winding or the rewinding, the tape may vibrate in the direction of the thickness of the tape and this vibration can fluctuate due to the physical properties of the magnetic tape and those of the tape winding body so that each side edge of the tape wound on the winding body is unneatly overlaid on itself. The higher that the speed of the winding is, the more unneatly the side edge is overlaid on itself.

A magnetic tape whose side edge is unneatly overlaid on itself as described above has problems that the external appearance of the wound tape housed as a commercial product in a magnetic tape cassette is bad. Furthermore, the side edge is likely to be damaged to result in various troubles such as the deterioration of the electromagnetic converting properties of the tape. The unneat overlaying is a serious drawback, particularly for a magnetic video tape for high-density recording, because an audio signal or a tuning signal is recorded near the side edge of the tape. For these reasons, in a conventional process of manufacturing a magnetic tape, the wound states of all magnetic tapes are visually inspected or the like after a winding process or a rewinding process. Since the inspection takes much time and money, the inspection is a major disadvantage in the magnetic tape manufacturing process.

Conventional systems, which are shown in FIGS. 1 and 2 and which accomplish what is called neat winding, have been adopted to wind a magnetic tape of low neat-winding yield in order to improve the wound state of the tape to reduce the necessity of its inspection. FIGS. 1 and 2 show perspective schematic views of tape winding bodies 2 and the vicinity thereof.

In the conventional system shown in FIG. 1, an endless flexible belt 11 made of rubber, polyimide or the like and rotatably supported by rollers 12, 13 and 14 is revolved together with the magnetic tape T and elastically pushes the magnetic side of the tape under relatively high pressure in the radial direction of the tape winding body 2 to neatly wind the tape.

In the conventional system shown in FIG. 2, a belt 15 made of a relatively soft nonwoven fabric or the like is provided between one flange of the tape winding body 2 and one side edge of the magnetic tape T to push the side edge of the tape T under relatively high pressure while the belt is supported by a roller 17 or the like and wound at a low constant speed from a belt send-out member 16 to a belt winding member 18 so as to neatly wind the tape.

However, since the belts 11 and 15 are placed in direct contact with the magnetic tape T in the above-mentioned systems, there are various problems that the magnetic layer of the tape is worn or the fibers of the nonwoven fabric come off to locally hinder recording on the tape, inappropriate pressure acts to deform the tape or damage its side edge, and so forth. For that reason, the systems do not function properly. In addition, since the wear and tear of the neat winding systems are large, they have disadvantages with regard to their cost and maintenance as well. The constitution of each of the systems needs to be such that the tape winding body 2 is moved between at least a working position and a non-working position when it is replaced. The constitution makes a magnetic tape winding device complicated and renders it relatively time-consuming to replace the tape winding body 2. The period of time required for the movement of the tape winding body 2 hinders the enhancement of productivity.

Two systems for winding a magnetic tape for a cassette are used today. One of them is an open winding system in which the tape is neatly wound and then inserted into the cassette as so to be a finished product. The other is an in-cassette winding system which is also called C-0 winding system or V-0 winding system and in which the tape is wound at the final stage of assembly of the cassette.

As for the in-cassette winding system, as shown in FIG. 3, the cassette 23 without the magnetic tape is first assembled, an outgoing tape winding body 2 and an incoming tape winding body 3 which are coupled to each other by a leading tape 10 are inserted into the cassette 23 and screws are tightened so as to provide an unfinished product generally called V-0, C-0 or the like. In the unfinished product, the leading tape 10 is partly pulled out by an in-cassette winder and cut in half. The front end of the magnetic tape T is spliced to one cut-off end of the leading tape 10 whose other cut-off end is held by a suction member 22. The tape winding body 2 having the leading tape spliced to the magnetic tape is rotated to wind the magnetic tape on the body 2 by a prescribed length. The magnetic tape T is then cut off. The rear end of the magnetic tape T wound on the winding body 2 is then spliced to the other cut-off end of the leading tape 10, thus finishing the product. Since the wound state of the magnetic tape T entirely depends on the physical properties of the tape T and the accuracy of the assembly of the cassette 23, the wound state cannot be well controlled. For that reason, the yield of well-wound magnetic tapes is low. In order to increase the yield, a roller 24, shown in FIG. 4, having an upper and a lower flanges 25 has been provided on a trial basis to apply a force to the magnetic tape in the direction of its width to push the tape T sideward However, after all, no means was available to improve the wound state of the magnetic tape.

Although the conventional winding systems shown in FIGS. 1, 2, 3 and 4 are for neatly winding a magnetic tape after the tape is made as source tape or other tape of smaller width, it has also been desired to neatly wind another magnetic tape having a large width and not yet made into a source tape without using a member such as a flange which restricts the side edge of the tape.

Meanwhile, a magnetic tape winding device was recently proposed in the Japanese Patent Application (OPI) No. 51642/86 (the term "OPI" as used herein means an "unexamined published application"). In the device illustrated in FIG. 5, a winding drive shaft 30 is removable coupled to the winding hub 41 of a winding reel 42 comprising the hub and a flange 42. At least one magnet 31 is provided to face the wound side edge of a magnetic tape across the flange 42 while the tape is wound on the reel 40 so as to improve the wound state of the tape. However, the magnet 31 provided around the shaft 30 has a problem that the wound state of the tape is worse at its central portion near the winding hub 41 than at the peripheral portion of the tape That is because the form of the magnet 31 is limited by the shaft 30. The magnet 31 is made annular so that the directions of the lines of magnetic force thereof are nonuniformly distributed near the central portion of the winding reel 40 due to the hollow central portion of the magnet. The magnetic flux density near the center of the reel 40 is so low that the magnetic force which pulls the magnetic tape T toward the flange 42 is unstable and weak at the initial stage of the winding of the tape. In addition, if the winding reel 40 has no flange (flangeless type), the magnetic tape winding device shown in FIG. 5 can not be applied to the winding reel.

SUMMARY OF THE INVENTION

The present invention was made in consideration of the above-mentioned circumstances.

Accordingly, it is an object of the present invention to provide both a method and a device for neatly winding a magnetic tape on a tape winding body even if the physical properties of the tape are irregular.

It is another object of the present invention to provide a method and a device for winding a magnetic tape without complicating the device and degrading the quality of the tape as in the above-described neat winding systems so as to improve the working properties of the process of the winding of the tape.

It is still another object of the present invention to provide a method and a device for winding a magnetic tape to greatly improve the wound state of the even if the tape is wound with the in-cassette winding system or has a large width as before being made into a source tape or is an already cut-off tape.

One of the methods of the invention is characterized in that a magnetic field is applied to the magnetic tape along the direction of its thickness through the tape winding body when the tape is wound thereon. The method is performed by a corresponding device in which the tape winding body is rotated to wind the magnetic tape and which is characterized in that a magnet is provided which generates the magnetic field extending through the magnetic tape in the radial direction of the tape winding body.

In another one of the devices, a tape winding body is rotated to wind the magnetic tape The device is characterized in that a magnet which generates a magnetic field extending almost along the direction of the thickness of the tape is provided at least near the tape winding body. The device includes a means for moving the magnet in the radial direction of the tape winding body depending on the wound diameter of the tape.

In the remaining device, a tape winding body is rotated to wind the magnetic tape. The device is characterized in that a magnet which generates a magnetic field extending almost along the direction of the thickness of the tape is provided at least near the tape winding body. Furthermore, a means for optionally moving the magnet along a tape winding shaft is provided.

DETAILED DESCRIPTION OF THE PREFERRED EMBODIMENTS

Embodiments of the present invention are hereafter described in detail with reference to the drawings.

Figure 1:
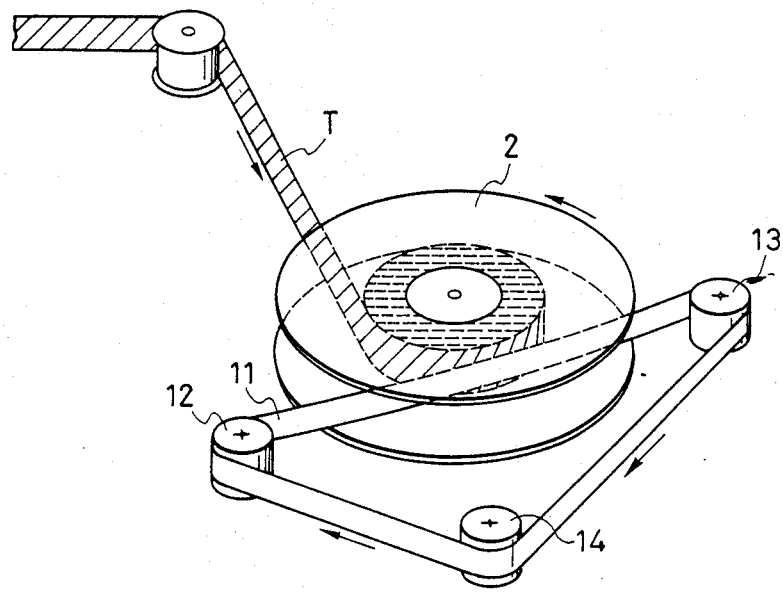
FIGS. 1 and 2 show perspective schematic views of portions of two conventional winding devices.
Figure 2:
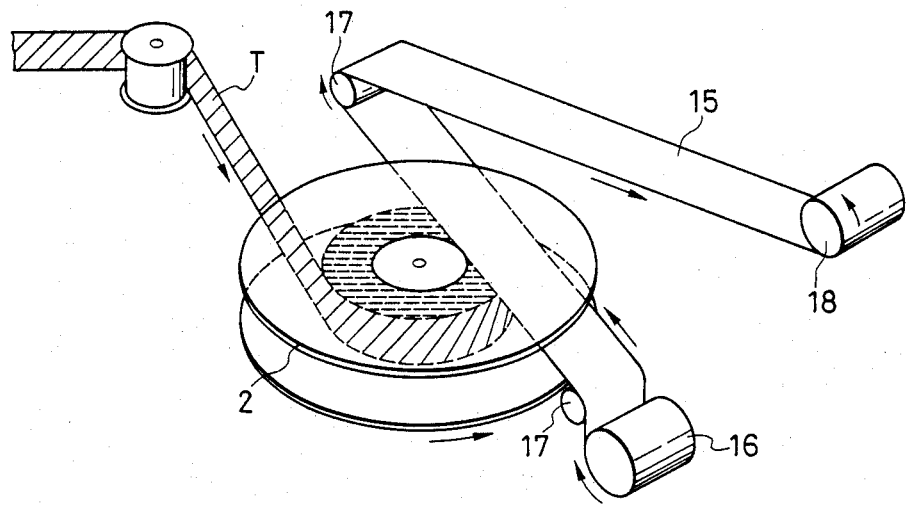
Figure 3:
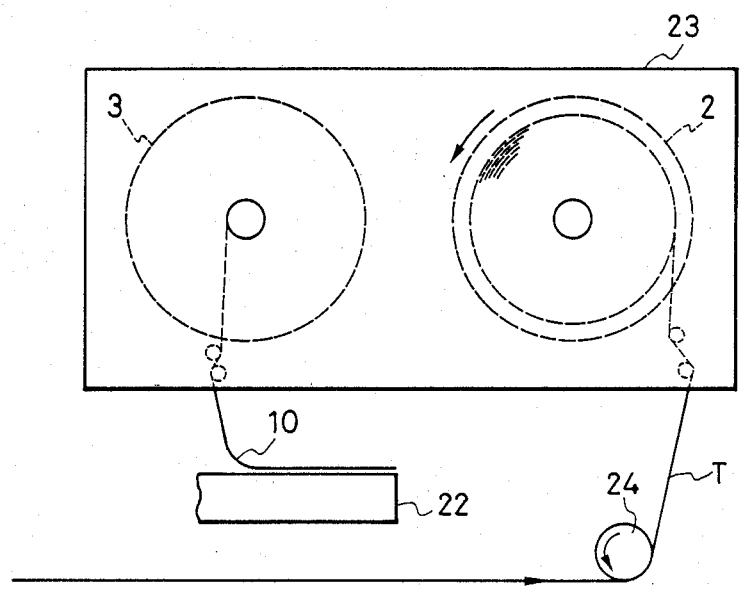
FIG. 3 shows a schematic plan view of a conventional winding device in the in-cassette winding system.
Figure 4:
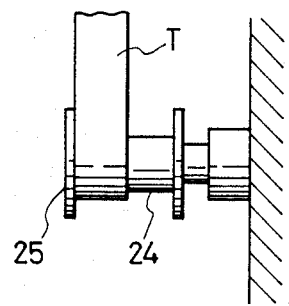
FIG. 4 shows an enlarged side view of a main portion shown in FIG. 3.
Figure 5:
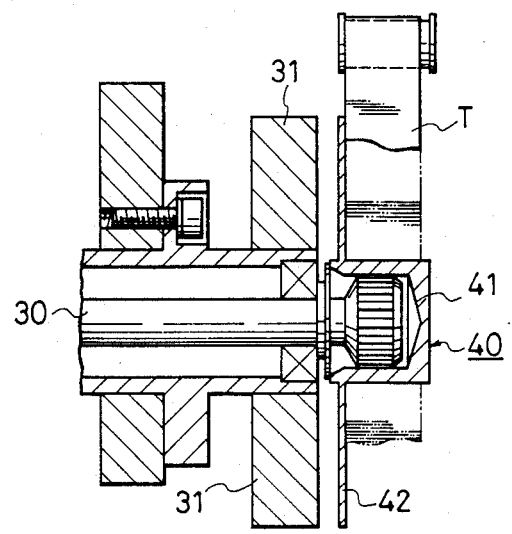
FIG. 5 shows a sectional view of a portion of another winding device.
Figure 6:
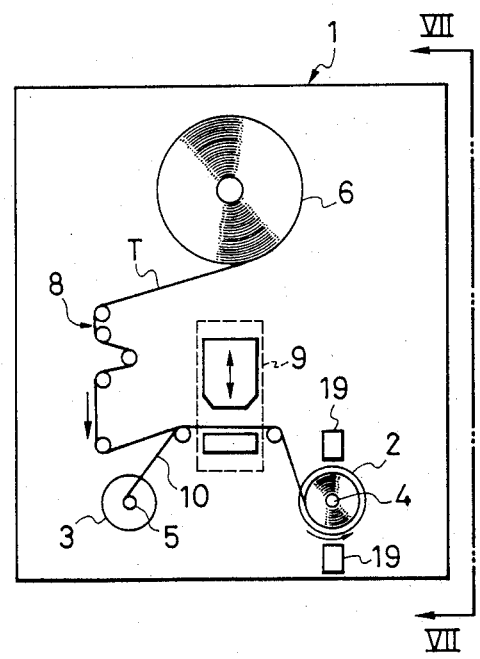
FIG. 6 shows a schematic front view of a winding device which is a first embodiment of the present invention.
Figure 7:
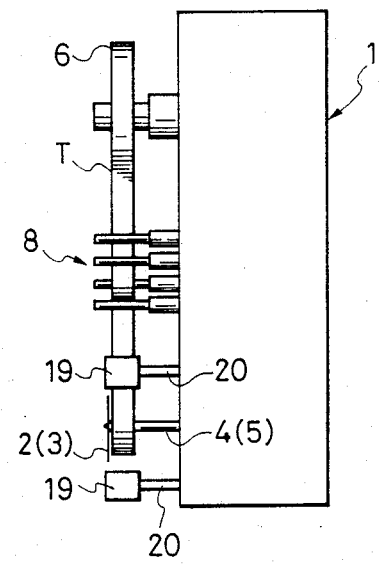
FIG. 7 shows a schematic side view of the device shown in FIG. 6.

FIG. 6 shows a magnetic tape winding device 1 which is the first embodiment of the present invention. FIG. 7 shows a side view of the device 1 seen along line VII—VII shown in FIG. 6.

The tape winding device 1 is used to perform a method in which a magnetic tape T is wound on a pair of tape winding bodies 2 and 3 (which are hereinafter also referred to as tape reels) before the tape and the tape winding bodies are put in a video tape cassette or the like.

The operation of the magnetic tape winding device 1 is described from now on. The tape reels 2 and 3 coupled to each other by a leading tape 10 (only half of which is shown in FIG. 6) having a prescribed length are mounted on shafts 4 and 5, which are rotated. The leading tape 10 is then cut off at almost its central portion. The cut-off end of the leading tape 10 at the take-up tape reel 2 is spliced to the front end of a tape T from a previously-mounted magnetic tape source 6 by a splicing tape or the like. After the magnetic tape T wound by a prescribed length on the take-up tape reel 2 is cut off, the cut-off end of the tape T is spliced to the other cut-off end of the leading tape 10 at the other tape reel 3. The cutting of the leading tape 10 and the magnetic tape T and the splicing of them are performed by a cutoff and splicing means 9 including a tape end holder, a cutter and the splicing tape. The cutoff and splicing means 9 is not shown in FIG. 7.

The magnetic tape T supplied from the tape source 6 is wound on the take-up tape reel 2 through a transport system 8 including guide pins and guide rollers.

Figure 8:
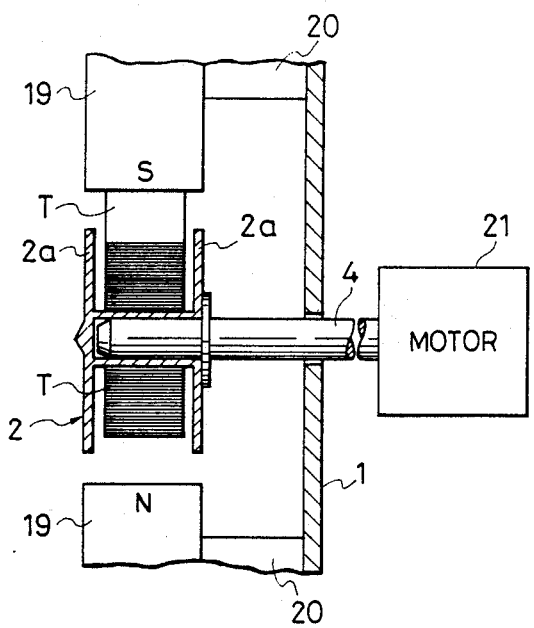
FIG. 8 shows an enlarged sectional view of a main portion along a shaft shown in FIG. 7.

The above-described operation is the same as a conventional winding device The winding device 1 provided in accordance with the present invention is characterized by a mounting portion for the take-up tape reel 2. At the mounting portion, a pair of permanent magnets 19 are provided around the tape reel 2, on which the magnetic tape T is wound. The permanent magnets 19 are attached to the body of the winding device 1 by support 20 so that the magnets extend in the diametric direction of the take-up tape reel 2 and are located symmetrically to each other as to the axis of rotation of the tape reel 2. As shown in FIG. 8, the mutually reversed poles of the permanent magnets 19 are opposed to each other so that the magnetic field between the poles extends almost along the diametric direction of the tape reel 2.

The shaft 4 is connected to a drive means 21 such as a motor so as to be rotated thereby When the magnetic tape T is wound by the winding device constructed as described above, the tape T is located in the lines of magnetic force which extend straight from the north pole of one of the permanent magnets 19 to the south pole of the other. For that reason, the wound turns of the magnetic tape T are pulled to each other along the direction of the thickness of the tape so that the frictional force between the wound turns is increased. As a result, the deviation or the like of the tape T, which would occur along the direction of its width due to the change in the behavior of the tape as the tape is wound, is prevented without mechanical contact with reel flanges 2a and the like. Therefore, the side edges of the magnetic tape T are evened up so that the tape T is very neatly wound and is kept in the very neatly wound state. Center winding, in which the magnetic tape T is wound almost in the middle between both the flanges 2a of the take-up tape reel 2 without coming into contact with the flanges, as shown in FIG. 8, can thus be performed.

Although the permanent magnets 19 are secured in prescribed positions in the first embodiment, the present invention is not confined thereto The magnets 19 may be rendered movable along the diametric direction of the tape reel 2 to cope with the size of the reel and to optionally change the intensity of the magnetic field which acts on the magnetic tape.

Figure 9:
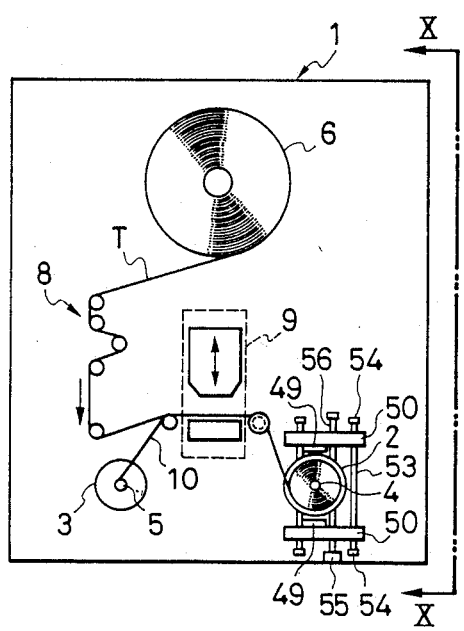
FIG. 9 shows a schematic front view of a winding device which is a second embodiment of the present invention.
Figure 10:
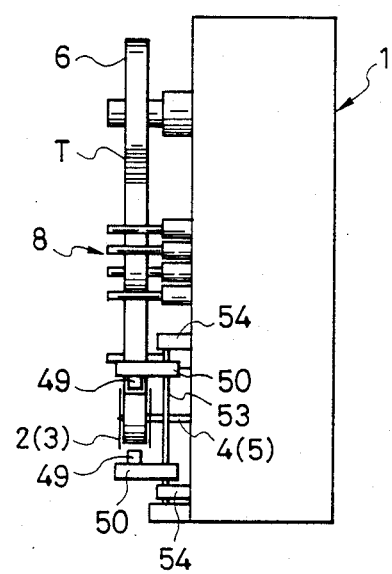
FIG. 10 shows a schematic side view of the device shown in FIG. 9.

FIG. 9 shows a schematic front view of a magnetic tape winding device 1 which is the second embodiment of the present invention. FIG. 10 shows a side view of the device 1 seen along a line X—X shown in FIG. 9. The same numerals in FIGS. 9 and 10 denote the same portions having the same functions as those in FIGS. 6, 7 and 8.

The tape winding device 1 shown in FIGS. 9 and 10 is characterized by a mounting portion for a tape reel 2. At the mounting portion, a pair of permanent magnets 49 are provided around the take-up tape reel 2 on which a magnetic tape is wound. Also at the mounting portion, a means for moving the magnets 49 depending on the wound diameter of the magnetic tape is provided.

The constitution of the moving means is now described in detail with reference to FIGS. 11 and 12. The permanent magnets 49 are attached to supports 50 so that the mutually inverse poles of the magnets 49 are opposed to each other across the take-up tape reel 2 along its diametric direction. The magnetic field between the poles extends almost along he diametric direction of the tape reel 2. A pair of shafts 53 (not shown in FIG. 12) extend through the supports 50 which are slidably supported on the shafts 53. The supports 50 can be moved by rotating a screw rod 56 extending in parallel with the shafts 53. The screw rod 56 and the shafts 53 are attached to the body of the winding device 1 by holders 54 and 52. The screw rod 56 is connected to a drive means such as a step motor 55 so that the supports 50 are moved to positions symmetric to each other as to the tape reel 2, by the rotation of the motor 55. For that movement of the supports 50, the screw threads of the screw rod 56 are provided on the halves of the rod and are inverse to each other in spiral thread direction and engage corresponding threads in the supports 50. The operation of the step motor 55 is controlled by a signal from a photosensor, an air microswitch or the like which detects the wound diameter of the tape. A shaft 4 is rotated by a drive means 51 such as a motor.

The permanent magnets 49 extend toward each other between both the supports 50. The thickness of each magnet 49 is smaller than the distance between the upper and lower flanges of the tape reel 2 so that the magnet can be moved in between the flanges to the vicinity of the hub of the tape reel.

Figure 11:
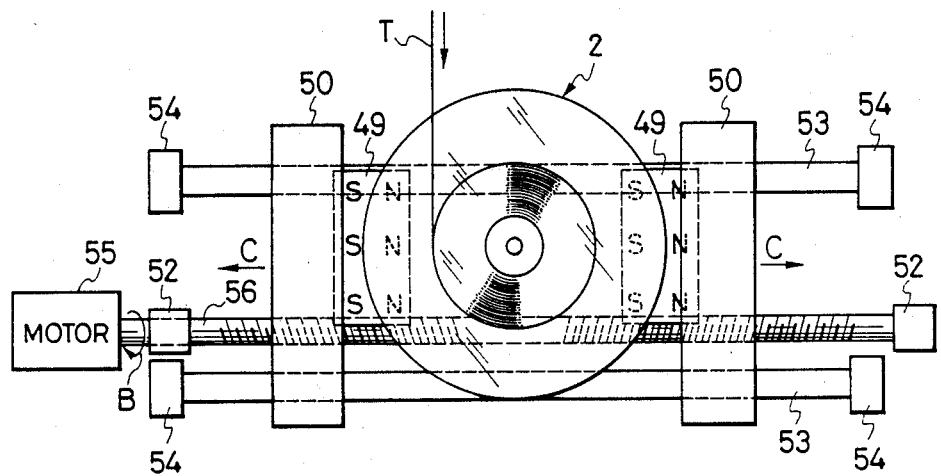
FIG. 11 shows an enlarged plan view of a main portion of the device shown in FIG. 9.
Figure 12:
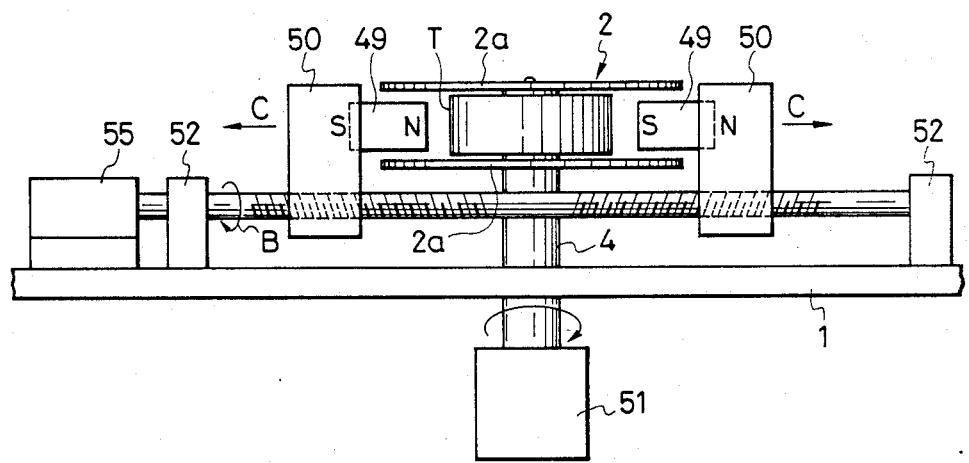
FIG. 12 shows an enlarged side view of a main portion of the device shown in FIG. 9.

Although each permanent magnet 49 is shaped as a rectangular parallelepiped as shown in FIGS. 11 and 12, the magnet may be shaped in such a manner that its facet opposed to the peripheral surface of the wound tape T is curved to correspond to the peripheral surface at its maximum diameter, minimum diameter, middle diameter or the like.

When the tape reel 2 is to be mounted on the shaft 4 to wind the magnetic tape by the winding device 1 constructed as described above, the supports 50 are moved to a right and a left stand-by positions (arrows C in FIG. 11 or 12). After the tape reel 2 is mounted on the shaft 4, the screw rod 56 is rotated in a direction opposite to an arrow B, to move the supports 50 to place the permanent magnets 49 near the hub of the tape reel 2. The winding of the magnetic tape T is then started. The tape T is thus wound to a prescribed diameter on the take-up reel 2.

During the winding of the tape T, the photosensor or the like detects the wound diameter of the tape and generates the signal to put the step motor 55 in operation to rotate the screw rod 56 in the same direction as the arrow B to move the supports 50 away from each other in the same direction as the arrows C to always place the permanent magnets 49 very near the magnetic tape T during the winding thereof.

When the magnetic tape T is wound on the reel 2 as described above, the tape T is located in the lines of magnetic force which straightly extend from the north pole of one of the permanent magnets 50 to the south pole of the other. For that reason, the wound turns of the tape T are pulled to each other along the direction of the thickness of the tape so that the frictional force between the wound turns is increased. As a result, the deviation or the like of the tape, which would occur along the direction of the width thereof due to the change in the behavior of the tape as the tape is wound, is prevented without mechanical contact with the tape.

Since the permanent magnets 49 are moved along with the increase in the wound diameter of the tape T as the magnets remain located near the peripheral surface of the wound tape, the magnetic field can be efficiently applied to the tape to true up the side edges of the wound tape to very neatly wind it and keep it in the very neatly wound state. Center winding, in which the magnetic tape T is wound almost in the middle between both the flanges 2a of the reel 2 without coming into contact with the flanges, as shown in FIG. 12, can thus be performed.

Since the permanent magnets 49 are always located near the magnetic tape T and the intensity of the magnetic force acting to the tape increases in inverse proportion to the square of the distance between the tape and each of the magnets, the magnetic force can be made very strong, namely, magnets of small magnetism can be used to neatly wind the tape T. Therefore, if electromagnets are provided instead of the permanent magnets 49, the electric power consumption of each of the electromagnets can be kept low.

Although the operation of the motor 55 is controlled by the signal from the photosensor or the like which detects the wound diameter of the tape in the second embodiment, the operation may be controlled in accordance with a preset program depending on the length of the wound tape and the speed of the winding thereof.

Figure 13:
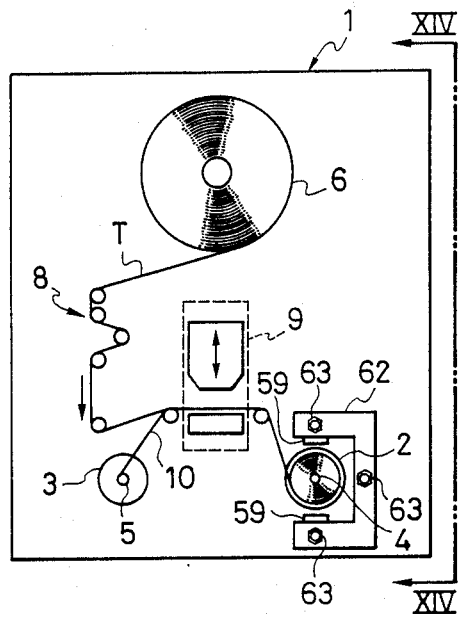
FIG. 13 shows a schematic front view of a winding device which is a third embodiment of the present invention.
Figure 14:
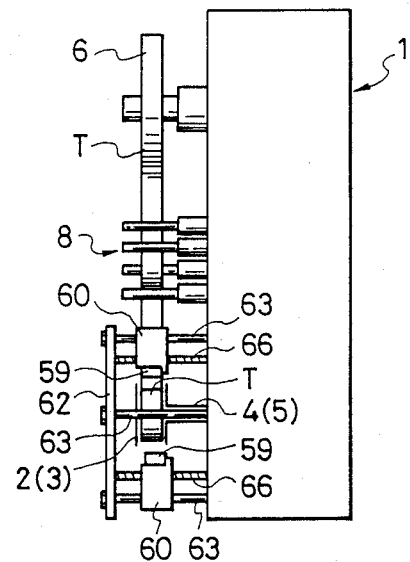
FIG. 14 shows a schematic side view of the device shown in FIG. 12.

FIG. 13 shows a schematic front view of a magnetic tape winding device which is the third embodiment of the present invention. FIG. 14 shows a side view of the device seen along a line XIV—XIV shown in FIG. 13. The same numerals in FIGS. 13 and 14 denote the same portions of the same functions as those in FIGS. 6, 7 and 8.

The device shown in FIGS. 13 and 14 is characterized by a mounting portion for a tape reel 2. At the mounting portion, a pair of permanent magnets 59 are provided around the take-up tape reel 2, on which a magnetic tape T is wound. Also at the mounting portion, a means for moving the permanent magnets 59 along a tape winding shaft 4 and thus along the direction of the width of the tape T is provided.

The constitution of the moving means of the magnetic tape winding device 1 shown in FIGS. 13 and 14 is described in detail with reference to FIGS. 15 and 16. The permanent magnets 59 are attached to a pair of internally threaded supports 60 so that the mutually inverse poles of the magnets are opposed to each other across the tape reel 2 along its diametric direction. As a result, the magnetic field between the poles extends almost along the diametric direction of the take-up tape reel 2. Two of three shafts 63 provided along the tape winding shaft 4 extend through the thread portions of the supports 60 which are slidably supported on the shafts 63. Two screw rods 66 are provided in parallel with the shafts 63 extend through the supports 60 so that the supports are moved by rotating the screw rods 66. The three shafts 63 and the two screw rods 66 are supported at their tips by a U-shaped holder 62 so that the shafts 63 and the rods 66 are attached to the body of the magnetic tape winding device 1 and can be either secured or rotated although bearings and other details for the attachment are not shown in the drawings. The screw rods 66 are connected to a drive means such as two motors 65. The supports 60 can be moved to appropriate positions along the direction of the width of the tape T by the rotation of the motors 65.

The shaft 4 is connected to a drive means 61 such as a motor so as to be rotated thereby.

When the magnetic tape T is wound at a winding section constructed as described above, the tape is located in the lines of magnetic force which extend straight from the north pole of one of the permanent magnets 59 to the south pole of the other. For that reason, the wound turns of the magnetic tape T are pulled to each other along the direction of the thickness of the tape T so that the frictional force between the wound turns is increased. As a result, the deviation or the like of the tape T along the direction of its width, which would occur due to the change in the behavior of the tape as it is wound, is prevented without mechanical contact with the tape. The tape does not even come into contact with the flanges of the reel 2. Therefore, the side edges of the magnetic tape T are evened up to very neatly wind the tape and keep it in the very neatly wound state. Center winding, in which the magnetic tape T is wound almost in the middle between both the flanges 2a of the reel 2 without coming into contact with the flanges, as shown in FIG. 16, can thus be performed.

The permanent magnets 59 can be optionally moved to desired positions along the direction of the width of the magnetic tape T along the direction of the width thereof. When the permanent magnets 59 are opposed to each other so that their axes are coincident with a center line C which extends between the flanges 2a of the reel 2 as shown in FIG. 16 and on which the density of the lines of magnetic force between the magnets is the highest, the center winding is performed. When the permanent magnets 59 are opposed to each other so that their axes are not coincident with the center line C, the wound position of the tape T is shifted relative to the center line C. The wound position of the tape T can thus be changed by altering the positions of the permanent magnets 59, as occasion demands.

Figure 15:
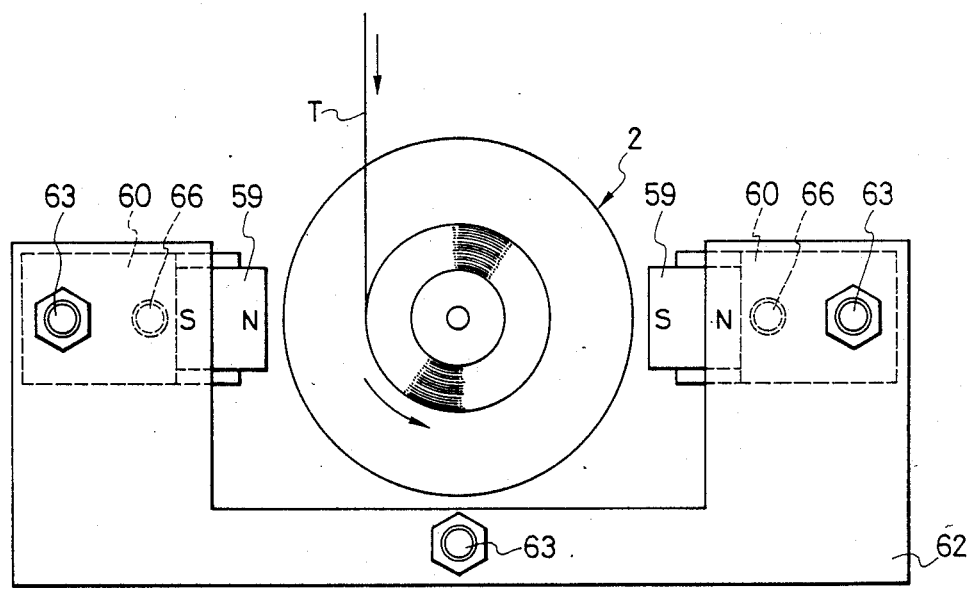
FIG. 15 shows an enlarged plan view of a main portion of the device shown in FIG. 13.
Figure 16:
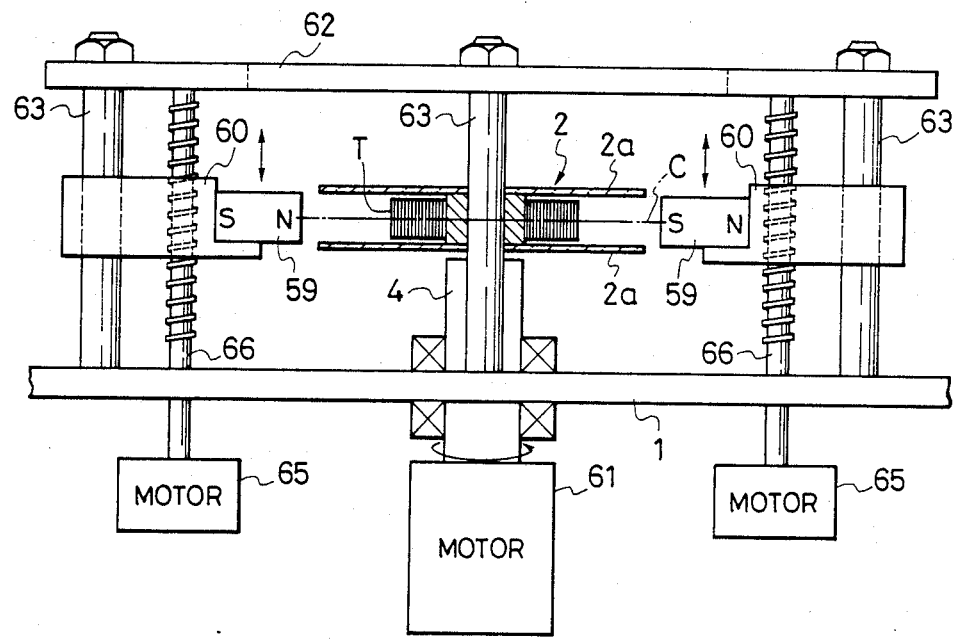
FIG. 16 shows an enlarged side view of the main portion of the device shown in FIG. 13.

Although each of the permanent magnets 59 is shaped as a rectangular parallelepiped as shown in FIGS. 15 and 16, its facet opposed to the peripheral surface of the wound tape T may be curved to correspond to the peripheral surface at its maximum diameter, minimum diameter, middle diameter or the like.

Although a pair of magnets 49 or 59 are provided so that their mutually inverse poles are opposed to each other across the tape reel 2 in each of the second and the third embodiments, a plurality of magnets may be provided on each support 50 or 60. It may be also allowed that the magnets are not opposed to each other across the tape reel 2 and at least one magnet is provided on only one support.

Figure 17:
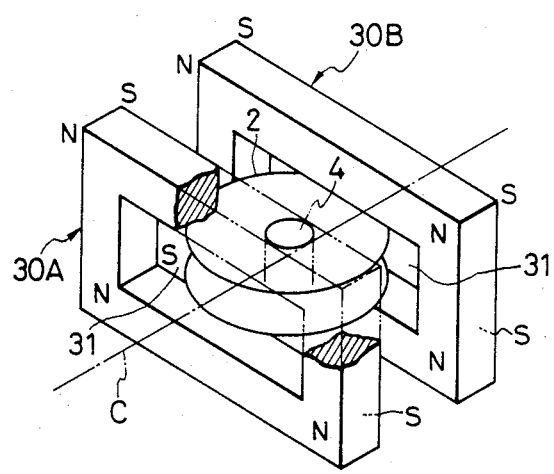
FIGS. 17 and 18 show perspective views of main portions of modifications of the above-mentioned embodiments of the present invention

Although the magnets are provided on the same plane along the diametric direction of the tape reel 2 in each of the first, the second and the third embodiments, the present invention is not confined thereto and a construction may be provided as shown in FIG. 17. In the constitution, two frame-like permanent magnets 30A and 30B having oblong internal openings 31 are provided around the tape reel 2. The lines of magnetic force between the poles of the magnets 30A and 30B extend along the diametric direction of the tape reel 2 so that the magnetic field between both the magnets 30A and 30B is confined between them. For that reason, the lines of magnetic force extending through the internal openings 31 of the magnets 30A and 30B are almost straight so that the magnetic field acts on the tape reel 2 in the same manner as in the first, the second and the third embodiments. Although the two permanent magnets 30A and 30B are provided in the constitution, only one of them may be provided, three or more such magnets may be provided and each of these magnets may not be shaped as an oblong frame but be shaped as a circle or another.

Figure 18:
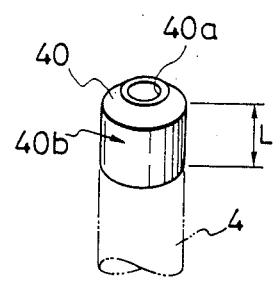

Although the magnets are provided outside the take-up tape reel 2 in each of the above-described embodiments, the present invention is not confined thereto and a magnet may be provided inside the tape reel 2 as shown in FIG. 18. When the magnet 40 is provided inside the tape reel 2 as shown in FIG. 18 (which does not show a claw or the like for engaging the magnet with the tape reel), the magnet has a cylindrical form and is located at the tip of the shaft 4, on which the tape reel 2 is fitted. The inner circumferential portion 40a of the magnet 40 has its north pole, while the outer circumferential portion of the magnet has its south pole. The permanent magnet 40 can generate a magnetic field extending almost along the diametric direction of the tape reel 2. It is preferable that the width L of the permanent magnet 40 is equal to or more than that of the tape reel 2. The magnet 40 may be removably attached to the shaft 4 or to the inside of the tape reel 2.

In the magnetic tape winding devices provided in accordance with the present invention, the intensity of the magnetic force of each of the permanent magnets is not particularly limited but may be set in consideration of the tension of the tape at the time of winding thereof, the kind of the tape, the distance between the magnet and the tape, the speed of the winding (the speed of movement of the tape), the influence of the magnetic field on the tape and so forth. The tape may be demagnetized after the winding, if necessary. Although the permanent magnets are provided in the above-described embodiments, the present invention is not confined thereto but electromagnets may be provided. The magnetic force of each of the electromagnets can be optionally changed by altering the magnitude of the electrical current of the electromagnet.

The present invention is not confined to the above-described embodiments. The present invention can be also applied to a process of winding a magnetic tape of large width on a flangeless winding body before the tape is made into a source tape, or to a process of winding a magnetic tape from a cutter which makes another tape into the former as source tape. In addition, the present invention can be applied to a winding device in a different winding system such as the in-cassette winding system. Furthermore, the present invention can be applied to wind a plurality of source tapes each having the same width as a tape as final product and made by slitting another source tape having a larger width than the tape as the final product. The invention can also be applied to wind a magnetic tape so as to shift its wound position relative to a winding reel or hub.

The magnets mentioned herein mean not only the permanent magnets and the electromagnets are described above, but also other magnetic field generation means such as a solenoid.

According to the present invention, a magnetic field is applied to a magnetic tape at the time of winding thereof to pull the wound turns of the tape and stabilize the movement of the tape to true up the side edges of the wound tape to very neatly wind it, as described above. A force for neatly winding the magnetic tape is applied thereto without bringing the tape into contact with a means for applying the force, whether a reel for winding the tape has a flange or not. When the tape is wound on a reel having an upper and a lower flanges, the wound position of the tape can be optionally set in the middle between the flanges or shifted relative thereto. Therefore, troubles such as bending of the tape and the damage to the side edge of the tape or to the magnetic side thereof can be prevented from occurring due to mechanical contact with the tape as in the prior art. The quality of the wound tape is thus enhanced. In addition, a magnetic tape winding device provided in accordance with the present invention has a major advantage that a means for truing up the side edges of the tape at the time of winding thereof is not complicated.

In the second embodiment of the present invention, the magnets can be located very near the magnetic tape and be optionally moved depending on the wound diameter of the tape so that the magnetic field between the magnets is very efficiently applied to the tape. Therefore, the magnetism of each of the magnets may be weak. If the magnets are electromagnets, the electric power consumption of each of the magnets may be low.

In the third embodiment of the present invention, the positions of the magnets can be optionally changed along the direction of the width of the magnetic tape to very easily set the wound position of the tape as occasion demands. The wound position of the tape can thus be set in the middle between the upper and lower flanges of the tape reel and be shifted relative to the flanges.

It will be understood from the above description that, according to the present invention, the quality of a wound magnetic tape and the productivity of a process of winding the tape can be enhanced. Especially, a greatly improved method and a greatly improved device for winding a magnetic tape can be provided in accordance with the present invention when a flange-less tape winding body and the in-cassette winding system are adopted.

What is claimed is:

1. A method for initially loading a magnetic tape onto a tape winding body to form a roll of tape having a diameter, comprising the steps of:

providing a magnetic means that is at least partially located on a line that is coincident with said diameter;

winding a magnetic tape onto a tape winding body by rotating said tape winding body about an axis of rotation, said tape, as it is being wound, increasing in thickness along a thickness radius that is perpendicular to said axis of rotation; and applying a magnetic field with said magnetic means having flux lines extending primarily along a thickness radius of said wound tape on said tape winding body during said winding without physically touching said tape, said magnetic field having a strength such that respective widths of the respective magnetic tape layers which are wound are substantially aligned.

2. A method as recited in claim 1, wherein said magnetic field is applied by magnetic field means and further comprising moving said magnetic field means in the direction of said thickness radius of said wound tape during said winding.

3. A method as recited in claim 1, wherein said magnetic field is applied by magnetic field means and further comprising moving said magnetic field means in a direction transverse to the direction of said thickness radius of said wound tape.

4. A magnetic tape winding device for initially loading a magnetic tape onto a tape winding body to form a roll of tape having a diameter, comprising:
a tape winding body for winding a magnetic tape by rotating said tape winding body about an axis of rotation, said tape, as it is wound, increasing in thickness along a thickness radius that is perpendicular to said axis of rotation;
means for rotating said tape winding body; and
magnetic means disposed out of contact with said magnetic tape and at least partially located on a line that is coincident with said diameter for generating a magnetic field having flux lines extending primarily along a thickness radius of a body of said magnetic tape as it is wound on said tape winding body, said magnetic field having a strength such that respective widths of the respective magnetic tape layers which are wound are substantially aligned.

5. A magnetic tape winding device as recited in claim 4, wherein said magnetic means comprises first and second magnetic means disposed on opposing sides of a diameter of said rotating tape winding body and having mutually inverse poles facing said tape winding body.

6. A magnetic tape winding device as recited in claim 4, wherein said magnetic means comprises a magnet having an internal opening along an axis coincident with said diametric direction of said rotating tape winding body, opposing poles of said magnet being located at opposite ends of said opening and along said axis.

7. A magnetic tape winding device as recited in claim 4, wherein said tape winding body has an internal hub and wherein said magnetic means are disposed at least partially inside said hub.

8. A magnetic tape winding device for initially loading a magnetic tape onto a tape winding body, comprising:
a tape winding body for winding a magnetic tape;
means for rotating said tape winding body;
magnetic means disposed out of contact with said magnetic tape for generating a magnetic field extending through said tape along a diametric direction of said rotating tape winding body, said magnetic field having a strength such that respective widths of the respective magnetic tape layers which are wound are substantially aligned; and
means for moving said magnetic means along said diametric direction of said tape winding body during said winding of said tape in response to a diameter of said wound tape on said tape winding body, thereby keeping said magnetic means in close proximity to said wound tape without touching said wound tape.

9. A magnetic tape winding device as recited in claim 8, wherein said magnetic means comprises a pair of magnets on opposing sides of said tape winding body and having opposing poles facing said tape winding body and wherein said moving means moves said pair of magnets in opposite directions.

10. A magnetic tape winding device as recited in claim 9, wherein said tape winding body has flanges at opposed sides of said wound tape and wherein said moving means selectively moves said pair of magnets in and out between said flanges.

11. A magnetic tape winding device as recited in claim 8, wherein said moving means comprises:
a support holding said magnetic means;
a screw rod extending through said support;
a shaft slidably supporting said support; and
a motor for rotating said rod.

12. A magnetic tape winding device as recited in claim 11, further comprising a sensor for detecting a wound diameter of said wound tape and generating a motor operating control signal.

13. A magnetic tape winding device, comprising:
a tape winding body for winding a magnetic tape;
means for rotating said tape winding body;
magnetic means for generating a magnetic field extending through said tape along a diametric direction of said rotating tape winding body;
wherein said rotating means comprises a first shaft rotating said tape winding member and further comprising moving means for moving said magnetic means along an axial direction of said first shaft.

14. A magnetic tape winding device as recited in claim 13, wherein said magnetic means comprises first and second magnetic means disposed on opposing sides of said tape winding body and having opposing poles facing said tape winding body.

15. A magnetic tape winding device as recited in claim 13, wherein said moving means comprises:
a support holding said magnetic means;
a second shaft extending through said support in parallel with said first shaft and slidably supporting said support; and
a screw rod threadingly extending through said support in parallel with said first and second shafts; and
drive means for rotating said second shaft.

* * * * *